(12) United States Patent
Cichon

(10) Patent No.: US 6,675,283 B1
(45) Date of Patent: Jan. 6, 2004

(54) HIERARCHICAL CONNECTION OF PLURALITY OF FUNCTIONAL UNITS WITH FASTER NEIGHBOR FIRST LEVEL AND SLOWER DISTANT SECOND LEVEL CONNECTIONS

(75) Inventor: Gordon Cichon, München (DE)

(73) Assignee: SP3D Chip Design GmbH, Starnberg (DE)

(*) Notice: Subject to any disclaimer, the term of this patent is extended or adjusted under 35 U.S.C. 154(b) by 0 days.

(21) Appl. No.: 09/555,940
(22) PCT Filed: Nov. 3, 1998
(86) PCT No.: PCT/EP98/06948
§ 371 (c)(1),
(2), (4) Date: Jun. 28, 2000
(87) PCT Pub. No.: WO99/32988
PCT Pub. Date: Jul. 1, 1999

(30) Foreign Application Priority Data

Dec. 18, 1997 (DE) ............................................ 197 56 591

(51) Int. Cl.$^7$ .............................................. G06F 13/00
(52) U.S. Cl. .............................. 712/32; 712/11; 712/33
(58) Field of Search ................................. 712/11, 16, 32, 712/33

(56) References Cited

U.S. PATENT DOCUMENTS

| | | | | |
|---|---|---|---|---|
| 4,876,641 A | * | 10/1989 | Cowley ........................ | 712/13 |
| 4,952,930 A | | 8/1990 | Franaszek et al. .......... | 340/2.23 |
| 4,968,977 A | | 11/1990 | Chinnaswamy et al. ... | 340/2.24 |
| 4,992,933 A | * | 2/1991 | Taylor ........................ | 712/22 |
| 5,123,109 A | | 6/1992 | Hillis ........................... | 712/22 |
| 5,133,074 A | | 7/1992 | Chou .......................... | 711/146 |
| 5,163,120 A | * | 11/1992 | Childers et al. ............. | 712/15 |
| 5,204,828 A | * | 4/1993 | Kohn .......................... | 708/501 |
| 5,235,693 A | | 8/1993 | Chinnaswamy et al. .... | 711/159 |
| 5,471,626 A | * | 11/1995 | Carnevale et al. .......... | 712/219 |
| 5,530,817 A | | 6/1996 | Masubuchi ................... | 712/24 |
| 5,644,716 A | | 7/1997 | Autechaud et al. ......... | 709/213 |
| 5,655,133 A | | 8/1997 | Dupree et al. ............... | 712/23 |
| 5,861,761 A | * | 1/1999 | Kean ........................... | 326/41 |

FOREIGN PATENT DOCUMENTS

| | | |
|---|---|---|
| DE | 30 48 414 | 12/1979 |
| EP | 0515043 A2 * | 11/1992 |
| EP | 0701218 A1 * | 3/1996 |

* cited by examiner

Primary Examiner—Kenneth S. Kim
(74) Attorney, Agent, or Firm—Glenn Patent Group; Michael A. Glenn

(57) ABSTRACT

A device for a hierarchical connection of a plurality of functional units in a processor comprises a first connector with at least two inputs and an output, which is adapted for connecting one of the inputs to the output, a second connector with at least one input and an output, which is adapted for connecting the input to the output, and a buffer connected between the output of the second connector and the input of the first connector for buffering, for at least one clock cycle, a signal applicable to the at least one input of the second connector before H is forwarded to a further input of the first connector. The output of the first connector is connected to an input of a first functional unit. An output of a second functional unit is connected to a first input of the at least two Inputs of the first connector. The at least one input of the second connector is connected to a third functional unit. A signal connection from the output of the third functional unit, which is not a neighbour to the first functional unit, and the input of the first functional unit is possible only via the second connector, the buffer and the first connector rather than via the first connector alone so that the connection between the neighbouring functional units is higher in hierarchy than the connection between non-neighbouring units.

13 Claims, 4 Drawing Sheets

HIERARCHICAL CONNECTION OF PLURALITY OF FUNCTIONAL UNITS WITH FASTER NEIGHBOR FIRST LEVEL AND SLOWER DISTANT SECOND LEVEL CONNECTIONS

This is a national stage application of PCT/EP98/06948 filed Nov. 3, 1998, which claims the priority of German Application 197 56 591.3 filed Dec. 18, 1997.

FIELD OF THE INVENTION

The present invention relates to processor architectures and in particular to an architecture for connecting a plurality of functional units in a processor.

BACKGROUND OF THE INVENTION

In a processor a calculation task is achieved by the cooperative effort of several so-called functional units (F.U.), each functional unit performing a specific task. Some functional units perform special calculations, e.g. the addition or multiplication of numbers. Other functional units are able to store values, e.g. memories and register files. Yet other functional units carry out logic functions, e.g. an inversion, an AND operation and so on. Finally there are functional units which perform a communication with the "outside world", an example being bus interfaces. The functional units operate in parallel and deliver their results via outputs to a connection network, to which the inputs of the functional units are also connected, to obtain input values. The values which are output by functional units can thus be used again by other functional units or even by the same functional unit, e.g. in an iterative calculation, where the result is also used again as input value.

Most of the processors known today have very few separate functional units, chiefly due to the limited space available on the chips on which they are implemented. A known connection network is e.g. a so-called crossbar switch, which permits each functional unit to forward a result which it has calculated to every other functional unit.

FIG. 6 shows such a known processor implementation with n functional units 100, each having two inputs 102 and one output 104. The outputs 104 are connected to a crossbar switch 106, which is shown schematically in FIG. 6. It is thus possible to feed every value at an output of a functional unit 100 into each and every input of the same or another functional unit 100.

PRIOR ART OF THE INVENTION

A parallel processor with a processor array and a crossbar switch is e.g. known from the U.S. Pat. No. 5,123,109. The crossbar switch or router is there connected to a data generation circuit and to a data receiving circuit of the processors in the processor array so as to make it possible to transmit information between the processors in the array in accordance with the respective addresses in response to router control signals from a control circuit. The connection circuit connects the data generator and the data receiver of each processor to a data receiver and a data generator of neighbouring processors in the array so as to make it possible to transfer data between each processor and at least one of the neighbouring processors simultaneously in response to control signals from the control circuit.

A disadvantage of this circuit is that this two-dimensional connection network in the crossbar switch is simply too complicated for a large number of processors or memories if numerous connections must be established randomly. Furthermore it should be noted that to connect n functional units requires a crossbar switch with $n^2$ connection points. As the number of functional units increases, the size and complexity of the crossbar connection network becomes increasingly dominant as regards the size, complexity and cost of the entire processor.

As a solution to the problem of the no longer justifiable number of connection points in a crossbar switch with a large number of functional units, U.S. Pat. No. 4,968,977 proposes that, instead of a single crossbar switch, a plurality of expandable crossbar modules be used, each of which provides a set of connections or defined mappings between the sets of input and output nodes and where each output is defined in terms of just one single input. In addition, each crossbar module is connected to a separate input and output port via which the module is connected to other identically configured modules if additional nodes are to be integrated into the system. This modular construction enables an existing design to be expanded modularly without redesigning the whole connection network.

U.S. Pat. No. 5,655,133 discloses a massively multiplexed central processing unit with a plurality of independent calculating circuits in Harvard architecture with a separate internal result bus for transferring a resultant output from each calculating circuit and with a plurality of all-purpose registers which are coupled to each calculating circuit. Each all-purpose register has multiplexed input ports, which are connected to every result bus. Each all-purpose register also has an output port, which is connected to a multiplexed input port of at least one calculating circuit. The calculating units are here coupled in parallel to a main data bus in such a way that data which flow on the main data bus are simultaneously available for each calculating unit.

U.S. Pat. No. 4,952,930 relates to complete computer networks and discloses a hierarchical multipath network. Here a multipath network, i.e. a network in which a number of paths exist between a data source and a data destination, e.g. the Internet, is described as a hierarchical connection structure between a plurality of sources and a plurality of destinations. The hierarchy comprises a first multipath network without storage, which consists of two or more stages and which provides a quick path for connecting a source to a destination. At least one second multipath network with storage and a plurality of stages constitutes an alternative slower path for connecting a source to a destination if a connection between the source and the destination over the first, fast path is blocked. The address field of a message from a source is investigated at each stage so as to select a suitable connection to the next stage, the message being passed on to the second stage without the address field if the connection is available and being stopped if the next stage is blocked, a negative acknowledgment being returned to the source. Retransmission of the message over the second network in the hierarchy is initiated on receipt of a negative acknowledgment at the source.

DE 3048414 discloses a circuit arrangement for a data processing system in which a plurality of central subsystems are in data communication via a single input/output multiplexer, a transmission register being assigned to each central subsystem such that an output from a central subsystem is first fed into the transmission register which is assigned to this subsystem before being subsequently transmitted to one of the other central subsystems via the single input/output multiplexer.

SUMMARY OF THE INVENTION

It is the object of the present invention to provide a processor architecture in which every functional unit is connected to every other functional unit and in which at the same time attention is paid to an efficient layout of the connection network.

In accordance with a first aspect of the invention, this object is achieved by a device for the hierarchical connection of a plurality of functional units in a processor, comprising a first-order connector with at least two inputs and an output, which is adapted to be operated so as to connect one of the at least two inputs to the output, where the output of the first-order connector is connected to an input of a first functional unit and where an output of a second functional unit is connected to a first input of the at least two inputs of the first-order connector; and a second-order connector with at least one input and an output, which is adapted to be operated so as to connect the at least one input to the output, where the at least one input of the second-order connector is connected to a third functional unit and where a signal which is appliable to the at least one input of the second-order connector is bufferable before it is forwarded to a further input of the first-order connector; where connections which are established by the first-order connector exhibit shorter signal transit times than connections which are established by the second-order connector; where a connection between functional units which is established by the first-order connector is more frequently used in a task performed by the processor than is a connection between functional units which is established by the second-order connector.

In accordance with a second aspect of the invention, this object is achieved by a processor comprising a plurality of functional units; a device for the hierarchical connection of the plurality of functional units including a first-order connector with at least two inputs and an output, which is adapted to be operated so as to connect one of the at least two inputs to the output, where the output of the first-order connector is connected to an input of a first functional unit and where an output of a second functional unit is connected to a first input of the at least two inputs of the first-order connector; and a second-order connector with at least one input and an output, which is adapted to be operated so as to connect the at least one input to the output, where the at least one input of the second-order connector is connected to a third functional unit and where a signal which is appliable to the at least one input of the second-order connector is bufferable before it is forwarded to a further input of the first-order connector; where connections which are established by the first-order connector exhibit shorter signal transit times than connections which are established by the second-order connector; where a connection between functional units which is established by the first-order connector is more frequently used in a task performed by the processor than is a connection between functional units which is established by the second-order connector; and a controller for controlling the functional units and the device for hierarchical connection.

The present invention is based on the finding that in a processor with many functional units the preponderant part of the communication, i.e. of the usage of the connection network, normally occurs between particular functional units and not arbitrarily between all the functional units. Popular connections and less frequently used connections thus exist. According to the present invention this situation is taken into account in the interests of an efficient connection network. This means that the fastest possible communication connections are established for the preferred communication paths whereas the slow communication paths are subject to delay in the interests of the fast, i.e. important or frequently used, communication paths.

To exploit fully the advantages of the present invention, only a few neighbouring functional units are connected essentially directly via a first connector, while functional units arranged more remotely on a chip communicate via a second connector and with buffering with one of the few neighbouring functional units. The fast connection of neighbouring functional units also exploits the fact that neighbouring functional units are linked by very short wires or conductors, which means that the signal transit times are short, in view of which high clock frequencies can be used.

A relatively small multiplexer, which thus exhibits a minimal transit time, is preferably employed for the fast connection of functional units which communicate very frequently in comparison with the total activity in the processor. A multiplexer, though one with considerably more inputs than the first-order multiplexer, can also be used as the second connector.

To implement the storage facility between the small first-order connector and the large second-order connector, a register is preferably used, which stores a value received via the second-order connector until it is required by a functional unit connected to the first-order connector. A buffered value is thus buffered for at least one clock cycle. This buffering constitutes the essentially "intentional" retardation of the connections via the secondorder connector.

If it is assumed, however, that e.g. 90% of the connection activity occurs between neighbouring functional units, which are connected quickly via the first-order multiplexer, and only 10% of the connection activity in a processor occurs via the second-order connector and thus also via the memory, the additionally introduced wait cycle has only a minor effect on the total processor working time since values normally stored in the memory must be gathered from more remote functional units, which may involve a time of the order of the wait cycle. The present invention leads instead to a reduction in the processor working time in comparison with a processor with a large crossbar switch, which, due to its size, entails increased signal transit times.

To exploit optimally the advantages of the hierarchical connection network for connecting a plurality of functional units in a processor, the processor must be so programmed and the functional units so designed that as many calculations as possible can be performed by neighbouring functional units. The present invention will therefore exhibit the greatest benefits as regards the complexity of the connection network and the speed of the processor in the case of application oriented processors, such as those used in graphics processing equipment and the like, in which certain calculation structures occur very frequently.

BRIEF DESCRIPTION OF THE DRAWINGS

Preferred embodiments of the present invention are explained in more detail below making reference to the enclosed drawings, in which.

DETAILED DESCRIPTION OF THE PREFERRED EMBODIMENTS

Figure 1:
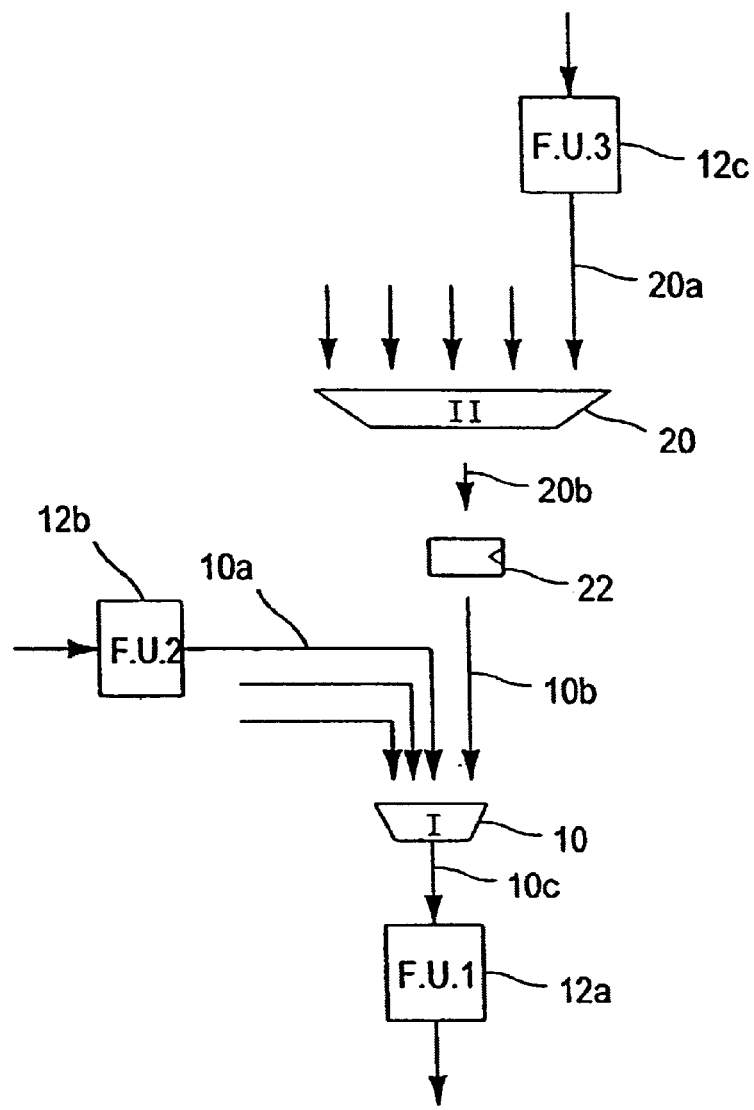
FIG. 1 shows a schematic generalized representation of a hierarchical connection between a plurality of functional units in a processor.

FIG. 1 shows a schematic representation of a device for the hierarchical connection of a plurality of functional units in a processor according to the present invention. The device for hierarchical connection comprises a first-order connector 10 with at least two inputs 10a, 10b and an output 10c. The output 10c has the input of a first functional unit 12a (F.U.1) connected to it. In the simplest case the first functional unit 12a also has one output. Functional units with just one input and one output can e.g. perform the function of a logical inverter. It should be pointed out, however, that the present invention can be implemented with functional units having an optional number of inputs and an optional number of outputs.

The device for the hierarchical connection of a plurality of functional units in a processor according to the present invention also comprises a second-order connector 20 with at least one input 20a and an output 20b. The at least one input 20a of the second-order connector 20 is connected to the output of a third functional unit 12c (F.U.3).

A second functional unit 12b (F.U.2) is connected to the first input 10a of the first-order connector 10. Preferably a memory 22 in the form of a register is connected between the output 20b of the second-order connector 20 and the second input 10b of the first-order connector 10. This memory 22 in the form of a register effects the storage function of the connection via the second-order connector 20. To persons skilled in the art it is obvious that the memory 22 could also be implemented as e.g. a delay element or similar and not necessarily as a register.

Even with the very simple embodiment of the functional units 12a to 12c shown in FIG. 1, the following operations can already be performed. If e.g. the first functional unit 12a frequently has to invert output values of the second functional unit 12b, a quick connection exists between the first and the second functional unit via the first-order connector 10, which, like the second-order connector 20, may preferably be implemented as a multiplexer. If an output value of the third functional unit 12c is only very rarely required by the first functional unit 12a, the wait time introduced by the memory 22 scarcely increases the computation time. In the interests of a fast connection between the first and the second functional unit, however, the first-order connector 10 could now be implemented as a very small multiplexer, i.e. as a multiplexer with very few inputs, whereby the transit time through the multiplexer 10 would be considerably shorter than the transit time through a multiplexer to which the third functional unit 12c was connected directly.

Closer examination of the hierarchical connector shown in FIG. 1 shows that the advantage of this connection in the real case is considerably greater if more than three functional units are interconnected. If all the functional units were to be connected to the first-order multiplexer 10, this would be a very large multiplexer with a rather large transit time. Frequently used communication connections between the same two functional units would thus also be retarded simply because many other functional units are connected which, however, are very rarely or almost never used. The idea of the present invention, therefore, is that a functional unit be connected to just a few other functional units via a fast first-order multiplexer and that these connections should constitute a large part of the communications requirement. A further connection, now more flexible but slower, to every other functional unit is provided additionally via a second-order multiplexer buffered by a register, the first-order multiplexer being fed by the second-order multiplexer via the register. The register 22 is used to store a value presented to the at least one input 20a of the second-order multiplexer 20 until this value is required by the first functional unit 12a, i.e. when the communication path via the second input 10b of the first-order connector 10 is enabled by a known multiplexer control device. An advantage therefore of this communication structure is that when there is frequent communication between the first functional unit 12a and the second functional unit 12b via the first-order multiplexer, the value in the register 22 is fetched relatively seldom, which means that quite a lot of time is available for reloading the register 22, e.g. to provide the memory 22 with the results from a more remote third functional unit 12c.

Figure 2:
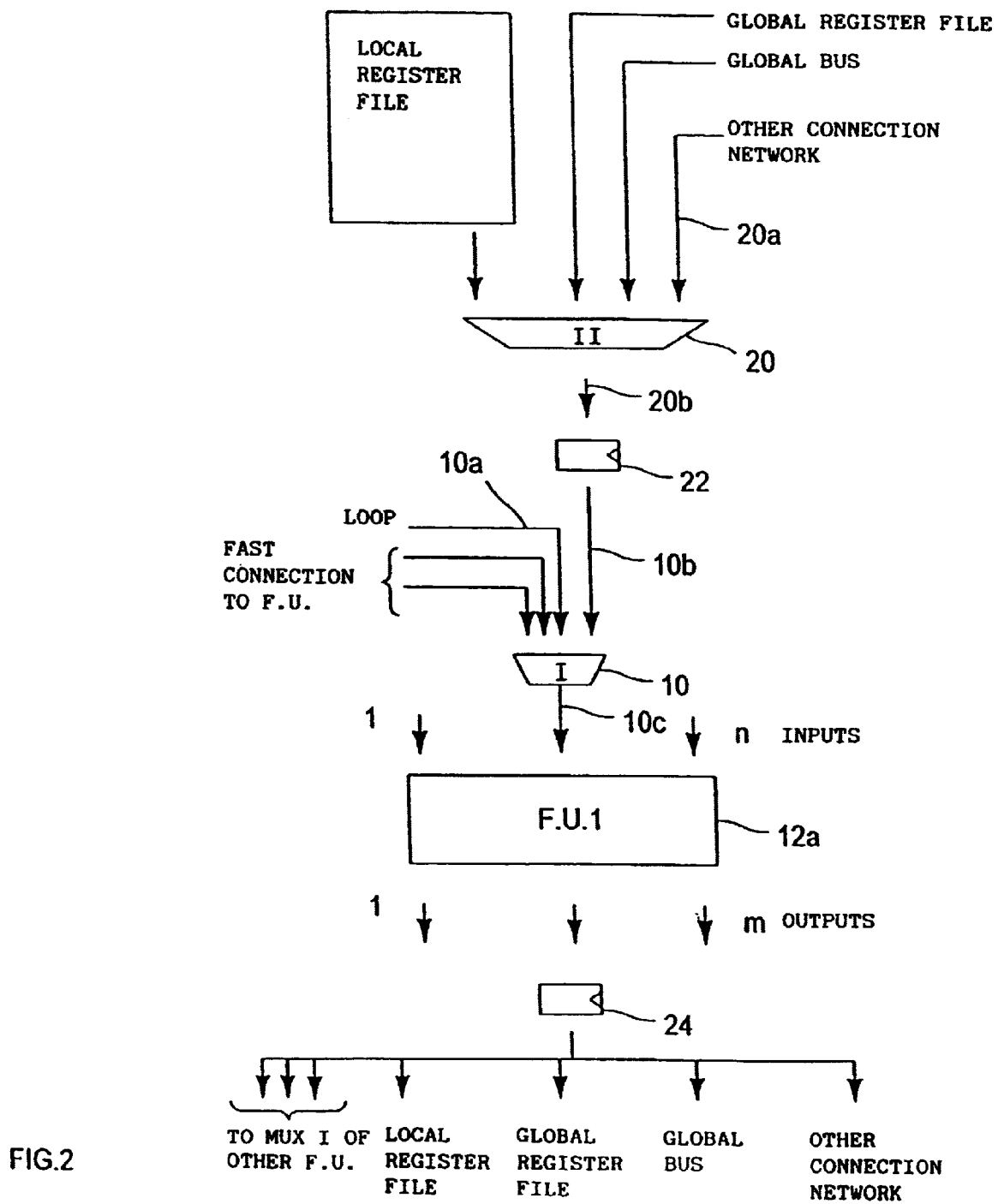
FIG. 2 shows a detailed representation of a hierarchical connection network with two levels.

FIG. 2 shows a detailed representation of a connection network with two levels, namely a first level of connections via the first-order connector 10 and a second level of connections via the second-order connector 20. In contrast to the first functional unit 12a in FIG. 1, the first functional unit 12a has an arbitrarily large number of n inputs and an arbitrarily large number of m outputs. In a practical realization of the hierarchical connection network, each input can be provided with a first-order connector 10. It is not important for the present invention, however, that every single input should have its own first-order connector 10. Preferably each output of the first functional unit 12a is provided with an output register 24, which can serve to store or amplify the signal contained therein.

As has already been mentioned, the second-order multiplexer 20 can have a very large number of inputs. Possible specific functional units which can be connected to the second-order multiplexer 20 include a local register file for storing values which are not necessarily required immediately by the functional unit. A global register file, which is to be found in most all-purpose processors and which may be of customary design, can also be connected to the second-order multiplexer 20. A global bus could also be connected to the second-order multiplexer 20, however, so as to be able to route a single value over the whole chip. The global bus can be connected directly to the multiplexer 20 or via a global bus interface. However, any other connection network which is encountered in this context can also be connected to the second-order multiplexer 20. This may e.g. be a known crossbar switch, to bring a value from anywhere in the processor to the functional unit 12a. However, it may also be a so-called hypercube network, which is particularly suitable for performing binary treelike calculations. Every other known connection network can, however, be connected to the at least one input 20a of the second-order multiplexer 20.

Apart from the input 10b, which is connected to the output of the memory 22, the first-order multiplexer 10 also has an optional though small number of additional inputs, which are provided for the purpose of fast connections to other functional units, which are preferably the neighbouring functional units to the first functional unit 12a. The input labelled "loop" serves to indicate that the output value of the functional unit 12a can also be fed back into the input of the functional unit, e.g. if the functional unit 1 is specified for iterative calculations.

It should be pointed out here that, with present technology, a multiplexer with four inputs has a latency of 1–2 ns. A single register has a similar latency. Time-critical on the other hand are large multiplexers and register files with several registers. A multiplexer with 8 inputs already requires e.g. 2–3 ns, while a register file with 16 registers already needs 5 ns for writing and another 5 ns for reading the values. It is therefore particularly advantageous to assign a multiplexer with very few inputs as the first-order multiplexer 10, whereas the number of inputs of the second-order multiplexer 20 plays no such dominating role since the preponderant part of the communication will take place via the first-order connector 10 and not via the second-order connector 20 and the memory 22.

Figure 5:
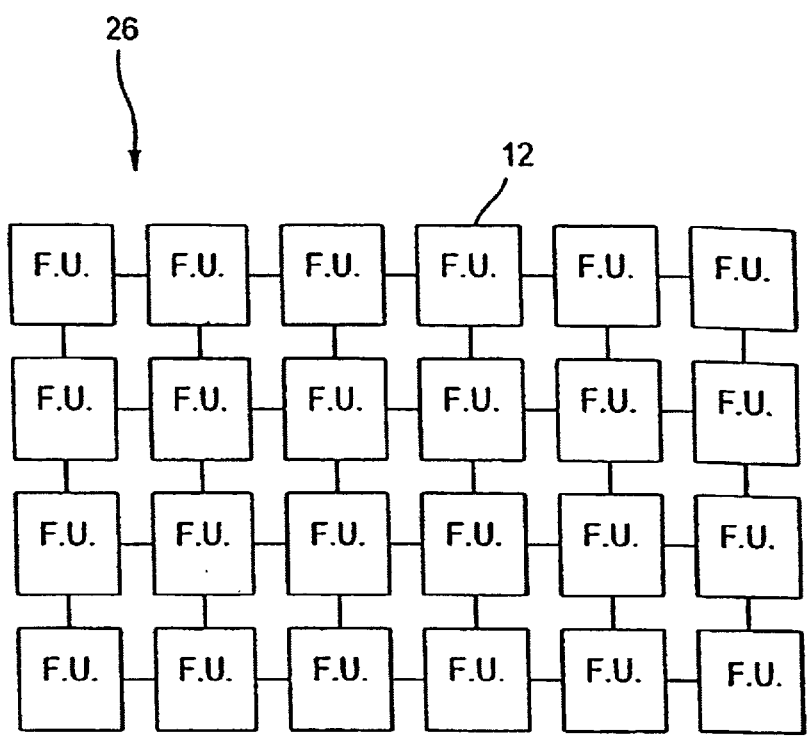
FIG. 5 shows a schematic planar processor layout.
Figure 6:
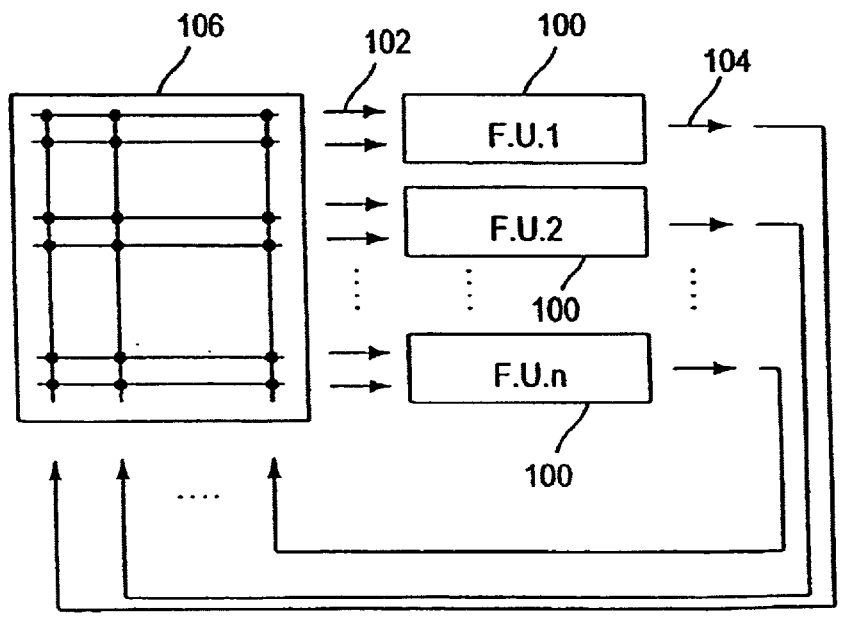
FIG. 6 shows a known connection architecture employing a crossbar switch.

At this point, a jump to FIG. 5, which shows the planar layout of a processor according to the present invention in which a functional unit is connected to four neighbouring functional units via a first-order multiplexer, while the same functional unit can communicate with every other functional unit-via a second-order multiplexer (not shown in FIG. 5). In this case the first-order multiplexer would already have six inputs, one for the loop, four for the fast connections to neighbouring functional units and one for the connection to the register file and to the second-order multiplexer. Particularly advantageous, however, are cases where only e.g. two neighbouring functional units must often communicate with each other. The first-order multiplexer would then, if no loop is required, have only two inputs and thus a minimal latency for the frequently required communication connection.

In the following the design rules for a hierarchical connection according to the present invention will be reiterated. First, it is desirable that only very few functional units should be connected to the first-order multiplexer, e.g. only three or four. Furthermore it is particularly advantageous if functional units which are close to each other on the chip, optimally neighbouring functional units, are connected to the first-order multiplexer. Finally, a register 24 should preferably be connected to the outputs of the functional unit so as to amplify the signal for further distribution. Preferably the register 24 distinguishes whether a value is to be routed to first-order multiplexers or to other processor components. In this case it may be sensible to amplify the values for the two cases differently. For the network which can be connected to the second-order multiplexer all known possibilities are available. The requisite architecture is completely unrestricted.

The hierarchical connection structure according to the present invention is thus capable of combining the advantages of a global connection network, which manifest themselves in the flexible performance of essentially all possible calculations and in a powerful exploitation of calculating resources, with the advantages of a local connection regime, which manifest themselves in very fast communication between units in close physical proximity, in a small chip area, in short wires and in a short delay or signal transit time.

Figure 3:
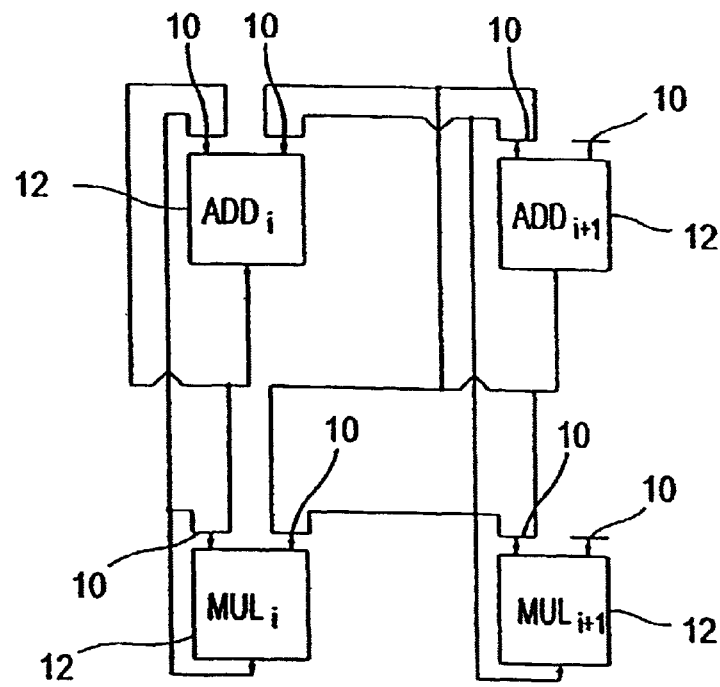
FIG. 3 shows first-order connections of functional units for a floating-point processor.

FIG. 3 shows a section of a uniform processor architecture with several functional units 12 in the form of adders (ADD) and multipliers (MUL). This architecture is e.g. suitable for implementing floating-point processors, which consist of floating-point adders and floating-point multipliers. The adders and multipliers are arranged in a row on the chip. The adders and multipliers are also capable of negating their results. Each unit (i) has two input ports and an output port. In FIG. 3 only the first-order multiplexers 10 are shown, and it is particularly clear from FIG. 3 that each functional unit input is provided with such a fast first-order multiplexer. For reasons of clarity, no second-order multiplexers are shown in FIG. 3. A second-order multiplexer in conjunction with a register 22 is, however, assigned to each first-order multiplexer 10 as the third input in order to feed an adder or multiplier from a local register memory or a global register memory with e.g. constant values or variable values which have been calculated long in advance. It is also clear from FIG. 3 that, in this embodiment of the present invention, at the first level the respective left-hand input port of a functional unit is connected to the corresponding output port both of the adder and the multiplier, while the right-hand ports are connected to the output ports of the next adders and multipliers.

In the configuration shown in FIG. 3 the units are capable of performing simple treelike calculations without additional circuitry, whereas tree schemes with a more complex data flow necessitate a switchover to the second level, in which case at least the latency introduced by the register 22 becomes effective. If the calculation is predominantly treelike, however, the major part of the additional circuitry can be dispensed with and does not contribute to the calculation time.

Figure 4:
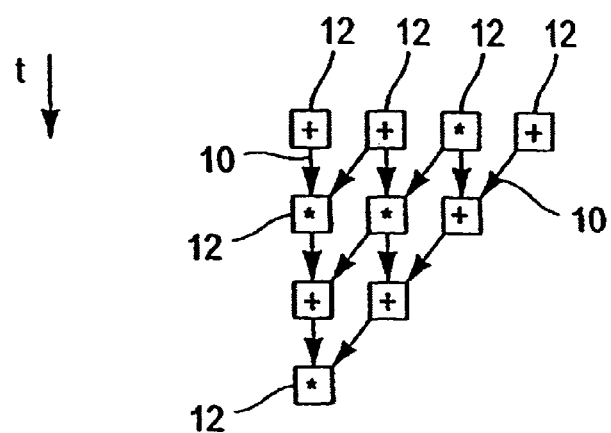
FIG. 4 shows a preferred calculation arrangement, which features connections via first-order connectors only.

FIG. 4 shows an example of a calculation in which the various functional units are shown next to one another. The time sequence in FIG. 4 is furthermore from top to bottom, which is represented symbolically by the arrow labelled t. The inputs of the individual functional units 12 can be circuited via the corresponding first-order multiplexer 10, which is represented in FIG. 4 by the thick arrows. Equally, however, the outputs can be circuited via the second-order multiplexer, which has been omitted in FIG. 4 for the sake of clarity. Instead of the functional units obtaining their input values from neighbouring units as shown in FIG. 4, the functional units can read in data globally via the second-order multiplexer 20 and the register 22. This could be represented symbolically in FIG. 4 by arrows between two arbitrary units; because of the wait introduced by the register 22, however, these arrows would have to have a length of two "units" in the vertical direction. The functional units could, however, also read from a register file. This reading could be executed by a register read access one cycle prior to the corresponding calculation. The output values of the functional units and in particular of the last functional unit 12 in FIG. 4 can be connected to arbitrary register file write ports. The results which do not need to be used again immediately, but which are to be stored for subsequent further processing or output, can then be written into register files.

FIG. 5 shows a processor of planar design with a plurality of functional units 12. As has already been mentioned, it is clear from FIG. 5 that each respective functional unit is connected to its four neighbouring functional units via a first-order multiplexer (not shown in FIG. 5). The second-order multiplexers are not shown in FIG. 5 for reasons of clarity. They can, however, be imagined as arrows between arbitrary non-neighbouring functional units. It is obvious to persons skilled in the art that a processor also comprises control devices which ensure correct sequencing of the various functional units and multiplexers.

In conclusion it should be noted that, although FIG. 2 might create another impression, a register file can equally well be understood as a functional unit, as was established in the introduction to this description. The same need not therefore be counted as part of the connection network. If a register file is regarded as an independent functional unit, this results in a single global and an optional number of local functional units, which in turn can themselves be circuited according to the proposed connection scheme. This example makes it clear that the hierarchical network according to the present invention is not restricted to only two levels but can encompass an unlimited number of intermeshed levels. In this case it can be taken into account that not only do communications between individual functional units often occur but that also communications between different groups of functional units preferentially occur. These groups would then, analogously to individual functional units, again be connected via a fast multiplexer and would be coupled to other groups which are not so often needed for communication via a memory and a larger and therefore slower multiplexer.

What is claimed is:

1. A device for a hierarchical connection of a plurality of functional units in a processor, the plurality of functional units being arranged in a formation in the processor, wherein a first functional unit and a second functional unit are physical neighbours as regards their location in the processor, and wherein the first functional unit and a third functional unit are not physical neighbours as regards their location in the processor, the device comprising:

- a first-order connector with at least two inputs and an output which is adapted to be operated so as to connect one of the at least two inputs to the output, where the output of the first-order connector is connected to an input of the first functional unit and where an output of the second functional unit is connected to a first input of the at least two inputs of the first-order connector;
- a second-order connector with at least one input and an output, which is adapted to be operated so as to connect the at least one input to the output, where the at least one input of the second-order connector is connected to the third functional unit; and
- a buffer connected between the output of the second-order connector and the input of the first-order connector for buffering, for at least one clock cycle, signal which is appligable to the at least one input of the second-order connector is before it Is forwarded to a further input of the first-order connector;
- where connections between the second functional unit and the first functional unit which are established by the first-order connector exhibit shorter signal transit times than connections between the third functional unit and the first functional unit which are established by the second-order connector, the buffer and the first-order connector;
- where a connection between the first and second functional units which is established by the first-order connector is more frequently used in a task performed by the processor than is a connection between the first and third functional units which is established by the second-order connector, the buffer and the first-order connector, and
- where a signal connection from the output of the third functional unit which is not a neighbour to the first functional unit and the input of the first functional unit is possible only via the second-order connector, the buffer and the first-order connector rather than via the first-order connector alone so that the connection between the neighbouring functional units is higher in hierarchy than the connection between non-neighbouring units.

2. A device according to claim 1, wherein the signal which is applicable to the at least one input of the second-order connector is bufferable by the buffer until the first functional unit requires the same.

3. A device according to claim 1, wherein the first-order connector and the second-order connector are implemented as multiplexers of the first and second order respectively.

4. A device according to claim 1, wherein the buffer of the signal which is applicable to the at least one input of the second-order connector is implemented by a register which is connected between the output of the second-order connector and the further input of the first-order connector.

5. A device according to claim 1, wherein the plurality of functional units is arranged in a planar formation in the processor.

6. A device according to claim 1, wherein a functional unit comprises a calculator, a memory, a logic unit or a bus interface unit.

7. A device according to claim 1, wherein the number of inputs of the first-order connector is smaller than the number of inputs of the second-order connector.

8. A device according to claim 1, wherein the number of inputs of the first-order connector is at most five and where four inputs of the first-order connector are occupied only by outputs of functional units which are physical neighbours of the first functional unit, while the bufferable signal of the second-order connector is applicable to the fifth input.

9. A device according to claim 1, wherein the output of the first, the second and the third functional unit are each provided with a register to buffer and/or amplify the output value of the respective functional unit.

10. A device according to claim 1, wherein the output value of a functional unit can be fed into an input of the first-order connector which is assigned to this functional unit.

11. A device according to claim 1, wherein the outputs of functional units which are not connectable via the first-order connector are connected to a communication interface which is in turn coupled to further inputs in accordance with the second-order connector.

12. A device according to claim 1, wherein each functional unit has an optional number of inputs and outputs, where each input of a functional unit is connected to the output of a first-order connector which is assigned to this input and where each output is connected to the input of its own register.

13. A processor comprising the following features:

- a plurality of functional units, the plurality of functional units being arranged in a formation in the processor, in which a first functional unit and a second functional unit are physical neighbours as regards their location in the processor and in which the first functional unit and a third functional unit are not physical neighbours as regards their location in the processor;
- a device for the hierarchical connection of the plurality of functional units comprising:
  - a first-order connector with at least two inputs and an output, which is adapted to be operated so as to connect one of the at least two inputs to the output, where the output of the first-order connector is connected to an input of the first functional unit and where an output of the second functional unit is connected to a first input of the at least two inputs of the first-order connector;
  - a second-order connector with at least one input and an output, which is adapted to be operated so as to connect the at least one input to the output, where the at least one input of the second-order connector is connected to the third functional unit; and
  - a buffer connected between the output of the second-order connector and the input of the first-order connector for buffering, for at least one clock cycle, a signal which is applicable to the at least one input of the second-order connector before it is forwarded to a further input of the first-order connector;

where connections between the second functional unit and the first functional unit which are established by the first-order connector exhibit shorter signal transit times than connections between the third functional unit and the first functional unit which are established by the second-order connector, the buffer and the first-order connector, where a connection between the first and second functional units which is established by the first-order connector is more frequently used in a task performed by the processor than is a connection between the first and third functional units which is established by the second-order connector, the buffer and the first-order connector, and where a signal connection from the output of the third functional unit, which is not a neighbour to the first functional unit and the input of the first functional unit is possible only via the second-order connector, the buffer and the first-order connector rather than via the first-order connector alone so that the connection between the neighbouring functional units is higher in hierarchy than the connection between non-neighbouring units; and a controller for controlling the functional units and the device for hierarchical connection.

* * * * *